United States Patent
Nakao

(10) Patent No.: US 7,806,976 B2
(45) Date of Patent: Oct. 5, 2010

(54) ALUMINUM PIGMENT, METHOD FOR PRODUCING THE SAME, AND WATER-BASED METALLIC PAINT COMPOSITION CONTAINING THE ALUMINUM PIGMENT

(75) Inventor: Takayuki Nakao, Osaka (JP)

(73) Assignee: Toyo Aluminium Kabushiki Kaisha, Osaka (JP)

( * ) Notice: Subject to any disclaimer, the term of this patent is extended or adjusted under 35 U.S.C. 154(b) by 0 days.

(21) Appl. No.: 12/596,962

(22) PCT Filed: Apr. 28, 2008

(86) PCT No.: PCT/JP2008/058176

§ 371 (c)(1),
(2), (4) Date: Oct. 21, 2009

(87) PCT Pub. No.: WO2008/139917

PCT Pub. Date: Nov. 20, 2008

(65) Prior Publication Data

US 2010/0083875 A1 Apr. 8, 2010

(30) Foreign Application Priority Data

May 9, 2007 (JP) .............................. 2007-124522

(51) Int. Cl.
- C09C 3/08 (2006.01)
- C09C 1/64 (2006.01)
- C09D 5/02 (2006.01)
- C09D 5/38 (2006.01)
- C09D 201/00 (2006.01)
- B22F 1/02 (2006.01)

(52) U.S. Cl. ....................... 106/404; 106/479; 427/214; 427/216; 427/218

(58) Field of Classification Search ................. 106/404, 106/479; 427/214, 216, 218
See application file for complete search history.

(56) References Cited

U.S. PATENT DOCUMENTS

| | | | |
|---|---|---|---|
| 4,158,074 A * | 6/1979 | Uchiyama et al. | 427/214 |
| 4,565,716 A * | 1/1986 | Williams et al. | 427/216 |
| 5,028,639 A | 7/1991 | Treutlein et al. | |
| 5,127,951 A * | 7/1992 | Imasato et al. | 106/404 |
| 5,296,032 A | 3/1994 | Jenkins et al. | |
| 5,372,638 A * | 12/1994 | DePue et al. | 106/404 |
| 5,494,512 A | 2/1996 | Yamamoto et al. | |
| 5,931,996 A * | 8/1999 | Reisser et al. | 106/404 |
| 6,454,847 B1 * | 9/2002 | Iri et al. | 106/404 |
| 6,602,339 B2 * | 8/2003 | Hashizume et al. | 106/404 |
| 6,863,718 B2 * | 3/2005 | Lamborn et al. | 106/14.12 |
| 7,163,580 B2 * | 1/2007 | Minami | 106/404 |
| 2006/0150864 A1 | 7/2006 | Hashizume et al. | |

FOREIGN PATENT DOCUMENTS

| | | |
|---|---|---|
| EP | 0 583 919 A1 | 2/1994 |
| JP | 49-96014 | 9/1974 |
| JP | 1-54386 B2 | 11/1989 |
| JP | 4-318181 A | 11/1992 |
| JP | 6-57171 A | 3/1994 |
| JP | 7-70468 A | 3/1995 |
| JP | 8-283603 A | 10/1996 |
| JP | 9-328629 A | 12/1997 |
| JP | 2003-147226 A | 5/2003 |
| JP | 2003-301131 A | 10/2003 |
| WO | WO-88/01637 A1 | 3/1988 |
| WO | WO-02/31061 A1 | 4/2002 |
| WO | WO-2004/096921 A1 | 11/2004 |

* cited by examiner

Primary Examiner—Anthony J Green
(74) Attorney, Agent, or Firm—Birch, Stewart, Kolasch & Birch LLP

(57) ABSTRACT

There is provided an aluminum pigment including an aluminum particle having a film formed on a surface thereof, wherein the film contains a metallic amine salt and the metallic amine salt is represented by the compositional formula $R_m H_n N^{+-}O\text{---}M(\!\!=\!\!O)_2\text{---}OH$ (wherein M represents a metal element, R represents a hydrocarbon chain optionally having a substituent, m represents an integer of 1 or more, and n represents an integer satisfying n=4−m).

12 Claims, No Drawings

ALUMINUM PIGMENT, METHOD FOR PRODUCING THE SAME, AND WATER-BASED METALLIC PAINT COMPOSITION CONTAINING THE ALUMINUM PIGMENT

TECHNICAL FIELD

The present invention relates to an aluminum pigment that is excellent in water resistance and is used in a water-based metallic paint, a water-based metallic ink, etc. for example, a method for producing the same, and a water-based metallic paint composition produced by incorporating the aluminum pigment.

BACKGROUND ART

When an aluminum pigment is incorporated into a water-based varnish, it has been conventionally known that problems exist such that the aluminum pigment reacts with water contained in the varnish, hydrogen gas is generated, and a container explodes during storage, that the aluminum pigment hardens and generates a granular structure, etc. Many techniques have been developed to solve this problem.

A method for treating an aluminum pigment with chromic acid is disclosed in Japanese Patent Publication No. 01-054386 (National Patent Publication No. 01-501631, Patent Document 1). According to this method, the chemical stability of the aluminum pigment is improved. However, it is not much put to practical use due to difficult points that the aluminum pigment having a small particle diameter cannot be treated because reactivity of the treatment liquid is too strong, that a problem from the viewpoint of industrial health or the environment is large because a hexavalent chromium compound is used, etc.

A method for treating an aluminum pigment with a treatment liquid containing an oxidizer such as molybdic acid, a phosphate ion, and an alkaline-earth metallic ion is disclosed in Japanese Patent Laying-Open No. 04-318181 (Patent Document 2). According to this method, the chemical stability of the aluminum pigment is improved. However, there is a tendency that the phosphate ion or the alkaline-earth metallic ion contained in the treatment liquid decrease moisture resistance and other physical properties of a coating film.

A method for treating an aluminum pigment with hetero polyanion such as phosphomolybdic acid is disclosed in U.S. Pat. No. 5,296,032 (Patent Document 3). However, sufficient chemical stability cannot be imparted to the aluminum pigment with this method, and a phosphate ion contained in the treatment agent decreases physical properties such as moisture resistance of the coating film.

A method for further stabilizing an aluminum pigment by treating the aluminum pigment with ammonium molybdate and then adding molybdate, etc. is disclosed in Japanese Patent Laying-Open No. 06-057171 (Patent Document 4). An aluminum pigment having relatively good chemical stability can be obtained with this method. However, the chemical stability is not necessarily sufficient, and there is a problem that the production process is complicated.

An aluminum pigment treated by peroxypolyacid is disclosed in Japanese Patent Laying-Open No. 09-328629 (Patent Document 5). Because a film derived from peroxypolyacid is dense and is excellent in corrosion resistance, an aluminum pigment can be obtained that is chemically stable against a water-based paint and a varnish for a water-based ink by forming this film on the aluminum pigment surface. As described above, this aluminum pigment has excellent chemical stability. However, because dispersibility of the aluminum pigment is not very good, there are problems that a granular structure is generated when forming a coating film and that appearance becomes poor.

Based on such conditions described above, the present inventors have found and proposed that an aluminum pigment having a film derived from peroxypolymolybdic acid and containing amine, and further an aluminum pigment having an adsorption layer of an organic phosphorus compound formed on the film, exhibit excellent water resistance (International Publication No. WO 2002/031061 (Patent Document 6)).

The aluminum pigment that is excellent in water resistance described above is a pasty aluminum pigment produced by forming an inorganic film on the aluminum surface by adding amine, a solution in which metallic molybdenum is dissolved in a hydrogen peroxide solution, and a hydrophilic solvent to an aluminum pigment composition containing an organic solvent, stirring and mixing in a heated condition, and by adding an organic phosphorus compound depending on necessity. The aluminum pigment is used as a metallic pigment by being incorporated upon the production of a paint that is the same as the conventional pasty aluminum pigment. This pasty water-resistive aluminum pigment can be used broadly because it is excellent particularly in water resistance and hardly aggregates and the characteristics of the coating incorporating and using this are also excellent. However, there has been a problem that the process is difficult to be controlled because heating is necessary in stirring and mixing for forming the film derived from peroxypolymolybdic acid on the aluminum surface, amine is necessary to suppress the aggregation due to an intense reaction of peroxypolymolybdic acid with aluminum, etc.

Further, a method for solving the above-described problem is disclosed in Japanese Patent Laying-Open No. 2003-301131 (Patent Document 7) in which similar water resistance can be obtained by incorporating an aluminum pigment dispersion of which peroxypolymolybdic acid, the aluminum pigment, water, and a dispersing agent are simply stirred and mixed when making it into a paint without using the aluminum paste previously formed on the aluminum surface by heating the film derived from peroxypolymolybdic acid. However, because peroxypolymolybdic acid is a strong acid solution in this method, a resin can be made unstable depending on the types and composition of the paint resin, and there has been a problem that the aluminum pigment aggregates in the paint.

Patent Document 1: Japanese Patent Publication No. 01-054386 (National Patent Publication No. 01-501631)
Patent Document 2: Japanese Patent Laying-Open No. 04-318181
Patent Document 3: U.S. Pat. No. 5,296,032
Patent Document 4: Japanese Patent Laying-Open No. 06-057171
Patent Document 5: Japanese Patent Laying-Open No. 09-328629
Patent Document 6: International Publication No. WO 2002/031061
Patent Document 7: Japanese Patent Laying-Open No. 2003-301131

DISCLOSURE OF THE INVENTION

Problems to be Solved by the Invention

The present invention solves the above-described problem, and has an object to provide an aluminum pigment having good chemical stability and in which aggregation is prevented during preparation and storage, a method for producing the same, and a water-based metallic paint composition produced by incorporating the aluminum pigment.

Means for Solving the Problems

The present invention provides an aluminum pigment including an aluminum particle having a film formed on the surface thereof, wherein the film contains a metallic amine salt, and the metallic amine salt is represented by the compositional formula $R_mH_nN^{+-}O—M(=O)_2—OH$ (wherein M represents a metal element, R represents a hydrocarbon chain optionally having a substituent, m represents an integer of 1 or more, and n represents an integer satisfying n=4−m).

In the aluminum pigment of the present invention, metal element M constituting the metallic amine salt preferably includes at least one selected from elements belonging to at least any of group IVA, group IVB, group VA, group VB, group VIA, and group VIB.

In the aluminum pigment of the present invention, the metal element M is preferably molybdenum.

In the aluminum pigment of the present invention, amine constituting the metallic amine salt preferably includes at least one selected from alkylamine, allylamine, arylamine, alkanolamine, and alkoxylamine.

In the aluminum pigment of the present invention, the content of the metal element M constituting the metallic amine salt is preferably in a range from 0.02 to 10 parts by mass with respect to 100 parts by mass of the aluminum particles.

In the aluminum pigment of the present invention, the content of the amine constituting the metallic amine salt is preferably in a range from 0.01 to 100 parts by mass with respect to 100 parts by mass of the aluminum particles.

The aluminum pigment of the present invention preferably contains a nitrogen element in a range from 0.0045 to 45 parts by mass with respect to 100 parts by mass of the aluminum particles.

In the aluminum pigment of the present invention, the content of the metallic amine salt is preferably in a range from 0.5 to 20 parts by mass with respect to 100 parts by mass of the aluminum particles.

In the aluminum pigment of the present invention, an adsorption layer containing an organic phosphorous compound is further formed on the film containing the metallic amine salt.

The present invention provides a method for producing an aluminum pigment to obtain any one of the above aluminum pigment, including the steps of preparing a metallic amine salt solution produced by dissolving at least a metallic amine salt into a hydrophobic solvent or a hydrophilic solvent, and forming a film containing the metallic amine salt on the surface of the aluminum particles by mixing at least the aluminum particles and the metallic amine salt solution.

The method for producing the aluminum pigment of the present invention further includes the step of forming an adsorption layer containing an organic phosphorous compound on the film after the step of forming a film.

The present invention provides a water-based metallic paint composition produced by incorporating any one of the above aluminum pigment.

Effects of the Invention

According to the present invention, it becomes possible to provide an aluminum pigment having good chemical stability and in which aggregation is prevented during preparation and storage, a method for producing the same, and a water-based metallic paint composition produced by incorporating the aluminum pigment.

BEST MODES FOR CARRYING OUT THE INVENTION

Below, the present invention is described in further detail showing typical embodiments.

[Aluminum Pigment]

The aluminum pigment of the present invention is produced by forming a film containing a metallic amine salt (referred to as "a metallic amine salt film" below) on the surface of Aluminum particles, and amine salt is represented by the compositional formula $R_mH_nN^{+-}O—M(=O)_2—OH$ (wherein M represents a metal element, R represents a hydrocarbon chain optionally having a substituent, m represents an integer of 1 or more, and n represents an integer satisfying n=4−m).

<Description of Aluminum Particles>

The aluminum pigment of the present invention has aluminum particles as a base substrate. The aluminum particles used in the present invention may be constituted only of aluminum or may be constituted of an alloy containing aluminum, and the purity of aluminum in the aluminum particles is not particularly limited.

The shape of the aluminum particles is various shapes such as a granular form, a plate-like form, a lumpy form, and a flake form (scale-like form). However, the shape is preferably a flake form in respect that a coating film that is excellent in metallic nature and brightness can be obtained.

The average particle diameter of the aluminum particles is not particularly limited. However, it is preferably 1 μm or more, and more preferably 5 μm or more. Further, the average particle diameter is preferably 100 μm or less, and more preferably 30 μm or less. In a case where the average particle diameter is 1 μm or more, handling in the production process is easy and the aluminum particles hardly aggregate, and in a case where the average particle diameter is 30 μm or less, a design property particularly becomes good since the surface of the coating film obtained from the paint incorporating the aluminum pigment of the present invention can be prevented from being rough.

Moreover, in a case where the average particle diameter of the aluminum particles is 20 μm or less in the present invention, particularly good water resistance is imparted. Generally, in a case of using the aluminum particles whose average particle diameter exceeds 20 μm, a technology of controlling the generation of hydrogen gas in the paint system can be applied effectively by using a paint additive for example. However, in a case where the average particle diameter is 20 μm or less, it is difficult to form a uniform film on the surface of the aluminum particles and there is a tendency that it is difficult to obtain a good improvement effect of water resistance with the method of using the paint additive. In the present invention, a good improvement effect of water resistance is imparted by forming a film containing a specified metallic amine salt on the surface of the aluminum particles, and the film can be formed uniformly also in a case of using aluminum particles having a relatively small particle diameter. Therefore, the present invention is particularly effective in a case of using aluminum particles having a small average particle diameter represented by aluminum particles having an average particle diameter of 20 μm or less.

A shape coefficient of the aluminum particles obtained by dividing the average particle diameter by the average thickness (called "an aspect ratio" in the present specification) is preferably 5 or more, and more preferably 15 or more. Further, the aspect ratio is preferably 1,000 or less, and more preferably 500 or less. In a case where the aspect ratio is 5 or more, a coating film having a particularly good feeling of brightness can be obtained, and in a case where the aspect ratio is 1,000 or less, mechanical strength of the aluminum particles is high and a coating film having particularly good stability of color appearance can be obtained.

Here, the average particle diameter of the aluminum particles used in the present invention can be obtained by calculating a volume average particle diameter from the particle size distribution measured with a known particle size distribution measuring method such as laser diffractometry, a micro mesh sieve method, and a Coulter counter method. An average thickness can be calculated from the hiding power and density of the aluminum particles. The aspect ratio is calculated by dividing the measured average particle diameter by the average thickness.

The method of obtaining the aluminum particles is not particularly limited, and the aluminum particles may be made by pulverizing or grinding aluminum in the presence of a pulverizing medium using a pulverizing assistant in a ball mill or an attritor mill, or may be obtained by breaking an aluminum vapor deposited foil formed by performing a vapor deposition process on a film.

In the present invention, in a case of using the aluminum particles pulverized using a ball mill, etc., the pulverizing assistant may be adhered on the surface of the aluminum particles. The pulverizing assistants that can be used are normally aliphatic amine, aliphatic amide, aliphatic alcohol, etc. in addition to higher fatty acids such as oleic acid, stearic acid, isostearic acid, lauric acid, palmitic acid, and myristic acid. However, unsaturated fatty acid is normally used. Examples of the unsaturated fatty acid include oleic acid, linoleic acid, linolenic acid, ricinoleic acid, elaidic acid, zoomaric acid, gadoleic acid, and erucic acid.

Further, the pulverizing medium that can be used is mineral oil having a high ignition point such as mineral spirits and solvent naphtha, etc.

<Film Containing the Metallic Amine Salt (Metallic Amine Salt Film)>

In the aluminum pigment of the present invention, a metallic amine salt film is formed on the surface of the aluminum particles. The metallic amine salt film is typically formed by treating the surface of the aluminum particles with a metallic amine salt.

(Metallic Amine Salt)

The metallic amine salt used to form the metallic amine salt film is represented by the compositional formula $R_m H_n N^{+-} O-M(=O)_2-OH$ (wherein M represents a metal element, R represents a hydrocarbon chain optionally having a substituent, m represents an integer of 1 or more and 4 or less, and n represents an integer satisfying n=4−m). Because the metallic amine salt represented by the above-described compositional formula has a chemically stable structure in the form of the metallic amine salt, a vigorous reaction does not occur on the aluminum particle surface when forming the metallic amine salt film on the surface of the aluminum particles used in the present invention. Accordingly, the metallic amine salt film that is a film having excellent water resistance can be formed uniformly on the aluminum particle surface without aggregation of the aluminum particles being occurred.

Further, the metallic amine salt film does not react with a component such as a paint resin other than the aluminum pigment contained in the paint even when the aluminum pigment of the present invention is compounded into the paint. Therefore, in the present invention, aggregation of the aluminum pigment in the paint is prevented, and the physical properties of the coating film become good.

In the present invention, the metal element M in the above-described compositional formula preferably includes at least one selected from elements belonging to at least any of IVA group, IVB group, VA group, VB group, VIA group, and VIB group. Among these, Mo (molybdenum), W (tungsten), Nb (niobium), Ti (titanium), etc. are preferable, and Mo (molybdenum) is particularly preferable in respect that a metallic amine salt having good adhesion to the aluminum particles can be obtained.

Amine constituting the metallic amine salt is not particularly limited as long as it is amine corresponding to the above-described compositional formula. However, amine containing at least one of an alkyl group, an allyl group, an aryl group, an alkanol group, and an alkoxyl group is preferable. That is, the amine constituting the metallic amine salt preferably includes at least one selected from alkylamine, allylamine, arylamine, alkanolamine, and alkoxylamine. Moreover, R in the above compositional formula represents a hydrocarbon chain optionally having a substituent. However, this means that it may be a hydrocarbon chain that does not have a substituent such as an alkyl group, an allyl group, and an aryl group for example, or may be a hydrocarbon chain having a substituent such as a hydroxyl group and an alkoxyl group (such as an alkanol group (a hydroxylakyl group), an alkoxyalkyl group, etc.).

Specific examples of the amine constituting the metallic amine salt include such as methylamine, ethylamine, propylamine, isopropylamine, butylamine, amylamine, hexylamine, heptylamine, octylamine, nonylamine, decylamine, undecylamine, dodecylamine, tridecylamine, tetradecylamine, pentadecylamine, pentadecylamine, cetylamine, dimethylamine, diethylamine, dipropylamine, diisopropylamine, dibutylamine, dioctylamine, didecylamine, ditridecylamine, diisotridecylamine, dioctadecylamine, diaralkylamine, diamylamine, trimethylamine, triethylamine, tripropylamine, tributylamine, triamylamine, allylamine, diallylamine, triallylamine, cyclopropylamine, cyclobutylamine, cyclopentylamine, cyclohexylamine, aniline, methylaniline, dimethylaniline, ethylaniline, diethylaniline, O-toluidine, m-toluidine, p-toluidine, benzylamine, dibenzylamine, tribenzylamine, diphenylamine, triphenylamine, α-naphthylamine, β-naphthylamine, 3,3'-iminobis(propylamine), 2-ethylhexylamine, 3-(2-ethylhexyloxy)propylamine, 3-ethoxypropylamine, 3-(diethylamino)propylamine, di-2-ethylhexylamine, 3-(dibutylamino)propylamine, tetramethylethylenediamine, tri-n-octylamine, 3-(methylamino)propylamine, 3-(dimethylamino)propylamine, N-methyl-3, 3'-iminobis(propylamine), 3-methoxypropylamine, 2-dimethylaminoethanol, monoethanolamine, diethanolamine, triethanolamine, 2-amino-2-methyl-1-propanol, N,N-dimethyl-1,3-propanediamine, and morpholine, and a specifically preferable example among these is dialkylamine having 2 to 40 carbon atoms.

The metallic amine salt is sold on the market usually in a form of a solution, more typically a solution containing an organic solvent, and an example of a solution containing a metallic amine salt represented by the above-described compositional formula is SAKURA-LUBE S-710 (diisotridecylamine molybdate: 26 carbon atoms) manufactured by ADEKA Corporation. However, the metallic amine salt solution is not limited to this, and those containing the metallic amine salt represented by the above-described compositional formula may be used. Further, the metallic amine salt solution may contain a surfactant, etc. for example as a component other than the metallic amine salt as long as it does not hinder the formation of the metallic amine salt film onto the aluminum particle surface and does not disturb the effect of the aluminum pigment in the present invention.

In a case of using the metallic amine salt solution to form the metallic amine salt film, the solution is desirably diluted to a hydrocarbon based hydrophobic solvent to be added. The preferable hydrophobic solvent that can be used includes such as saturated hydrocarbon, unsaturated hydrocarbon, and aromatic hydrocarbon, and a solvent that can be normally used to form the aluminum pigment into paste such as mineral spirits and solvent naphtha is particularly preferable.

Further, the metallic amine salt solution can also be diluted to a hydrophilic solvent such as alcohol to be added. Specific examples of the hydrophilic solvent include such as methylalcohol, ethylalcohol, n-propylalcohol, isopropylalcohol, n-butylalcohol, isobutylalcohol, t-butylalcohol, n-amylalcohol, isoamylalcohol, acetone, methylcellosolve, ethylcellosolve, isopropylcellosolve, butylcellosolve, isobutylcellosolve, t-butylcellosolve, methoxybutanol, methylcarbitol, butylcarbitol, propylene glycol monomethylether, dipropylene glycol monomethyether, propylene glycol mono n-propylether, and propylene glycol n-butylether.

In the present invention, the content of the metallic amine salt with respect to the aluminum particles is in a range from 0.5 to 20 parts by mass, and particularly preferably in the range of 1 to 10 parts by mass with respect to 100 parts by mass of the aluminum particles. In a case where the content is 0.5 parts by mass or more, it is less likely that hydrogen gas is readily generated as a result of reaction between water and aluminum during the storage of a water-based paint when the aluminum pigment of the present invention is incorporated particularly into the water-based paint. In a case where the content is 20 parts by mass or less, it is less likely that stability with the lapse of time deteriorates as a result of elution of the metallic amine salt into the water-based paint.

(Content of Metal Element M)

The content of metal element M constituting the metallic amine salt in the metallic amine salt film in the aluminum pigment of the present invention is preferably in a range from 0.02 to 10 parts by mass, and particularly preferably in a range from 0.1 to 5 parts by mass with respect to 100 parts by mass of the aluminum particles. In a case where the content of the metal element M is 0.02 parts by mass or more, the chemical stability is particularly good, and it is less likely that hydrogen gas is generated as a result of reaction between water and aluminum in a water-based paint or that the aluminum pigment aggregates when the aluminum pigment is incorporated into the water-based paint for example. In a case where the content of the metal element M is 10 parts by mass or less, the aggregation of the aluminum pigment due to eluting the metallic amine salt into the water-based paint is prevented, and an aluminum pigment can be obtained that can give particularly good aesthetic effect and hiding properties to the coating film.

Furthermore, the content of the metal element M is preferably changed depending on the water-surface diffusion area of the aluminum particles before forming the metallic amine salt film. Specifically, the content is in a range from 0.02 to 10 parts by mass with respect to 100 parts by mass of the aluminum particles, and preferably satisfies the following formula, $$0.05 \times S \leq m \leq 2 \times S$$

Here, m is the content (parts by mass) of the metal element M with respect to 100 parts by mass of the aluminum particles, and S is the water-surface diffusion area ($m^2/g$) of the aluminum particles.

Moreover, the above-described content m of the metal element M can be determined by plasma emission analysis employing a calibration curve using a standard liquid containing the metal element M to a liquid extracted with an alkaline dissolution extraction method using ICP S-8000 manufactured by Shimadzu Corporation. The water-surface diffusion area of the aluminum particles is measured according to item 8.6 in JIS K5906.

(Amine Content)

In the aluminum pigment of the present invention, the content of the amine constituting the metallic amine salt in the metallic amine salt film is preferably in a range from 0.01 to 100 parts by mass, and particularly preferably in a range from 0.1 to 40 parts by mass with respect to 100 parts by mass of the aluminum particles. In a case where the content of the amine is 0.01 parts by mass or more, the chemical stability is particularly good, and it is less likely that hydrogen gas is generated as a result of reaction between water and aluminum in the water-based paint or that the aluminum pigment aggregates. In case where the content of the amine is 100 parts by mass or less, aggregation of the aluminum pigment due to eluting the metallic amine salt into the water-based paint is prevented, and an aluminum pigment can be obtained that can give particularly good aesthetic effect and hiding properties to the coating film.

Further, the aluminum pigment of the present invention preferably contains nitrogen element in a range from 0.0045 to 45 parts by mass with respect to 100 parts by mass of the aluminum particles. In the present invention, there is a case where a pulverizing assistant, etc. adhered upon the production of the aluminum particles remains in the aluminum pigment. However, at least most of the nitrogen element in the aluminum pigment originates from the metallic amine salt. In a case where the content of the nitrogen element is 0.0045 parts by mass or more with respect to 100 parts by mass of the aluminum particles, the improvement effect of the chemical stability when forming the metallic amine salt film is particularly good, and it is less likely that hydrogen gas is generated as a result of reaction between water and aluminum in the water-based paint or that the aluminum pigment aggregates. On the other hand, in a case where the content is 45 parts by mass or less, aggregation of the aluminum pigment due to eluting the metallic amine salt into the water-based paint is prevented, and an aluminum pigment can be obtained that can give particularly good aesthetic effect and hiding properties to the coating film.

Furthermore, the content of the amine in the metallic amine salt is preferably increased or decreased depending on the content of the metal element M in the metallic amine salt film formed on the aluminum particles surface. Specifically, the content of the metal element M is preferably in a range from 0.02 to 10 parts by mass with respect to 100 parts by mass of the aluminum particles, and satisfies the following formula, $$1 \times m \leq A \leq 5 \times m$$

wherein, A is the content of the amine (parts by mass) with respect to 100 parts by mass of the aluminum particles, and m is the content (parts by mass) of the metal element M with respect to 100 parts by mass of the aluminum particles.

Moreover, the content of the amine A is calculated from the amount of nitrogen element measured by chemical emission due to the oxidation decomposition of NO gas and the molecular structure of amine identified using an infrared (IR) spectroscopic analysis, using a total nitrogen analyzer (for example, TN-110 type manufactured by Mitsubishi Chemical Corporation).

In the present invention, it is particularly preferable that the content of the metal element M constituting the metallic amine salt is in a range from 0.02 to 10 parts by mass and the content of the amine constituting the metallic amine salt is in a range from 0.01 to 100 parts by mass with respect to 100 parts by mass of the aluminum particles.

<Adsorption Layer Containing Organic Phosphorous Compound>

In the present invention, an adsorption layer containing an organic phosphorous compound may further be formed on the metallic amine salt film as described above. The adsorption layer further enhances the improving effect of the chemical stability and the preventing effect of the aggregation that can be obtained by forming the metallic amine salt film on the aluminum particle surface, and at the same time, also improves dispersibility of the aluminum pigment in the paint, color appearance, alkaline resistance, and adhesiveness of the coating film. Further, because the organic phosphorous compound contains little phosphoric ion, it is preferable in respect that the adsorption layer containing an organic phosphorous compound does not have an adverse influence on physical properties of the coating film.

(Organic Phosphorous Compound)

Preferred examples of the organic phosphorous compound for forming the adsorption layer containing an organic phosphorous compound include such as acid phosphate, polyoxyethylene alkylphenol phosphoric acid, phosphate obtained by a reaction of an epoxy compound or an acrylic compound with phosphoric acid, and acrylic or methacrylic phosphate.

Particularly, a preferable compound includes a mixture of acid phosphate derived from aliphatic monohydric alcohol or aliphatic polyhydric alcohol having 4 to 18 carbon atoms and having a structure as follows, Orthophosphoric monoester of aliphatic alcohol: R—O—PO(OH)$_2$ and Orthophosphoric diester of aliphatic alcohol: (R—O)$_2$PO(OH).

More specifically, a preferred compound includes such as stearyl acid phosphate, myristyl acid phosphate, palmityl acid phosphate, lauryl acid phosphate, polyoxyethylenealkylphenylether acid phosphate, n-decyl acid phosphate, 2-ethylhexyl acid phosphate, oleyl acid phosphate, hexyl acid phosphate, butyl acid phosphate, ethylene glycol acid phosphate, mono(2-acryloyloxyethyl) acid phosphate, mono(2-methacryloyloxyethyl) acid phosphate, 2-acryloyloxyethyl acid phosphate, 2-methacryloyloxyethyl acid phosphate, or (2-hydroxyethyl)methacrylate acid phosphate.

Further, the organic phosphorous compound may be a polymer, and a polymer particularly having an average molecular weight in a range from 400 to 10,000 is preferable. In a case where the average molecular weight is 400 or more, when forming the coating film using a coating composition incorporated with the aluminum particles containing the metallic amine salt of the present invention and a paint resin, there is obtained an advantage that the adhesiveness of the aluminum particles containing the metallic amine salt with the paint resin increases, and that the physical properties of the coating film become good. In a case where the molecular weight is 10,000 or less, it is preferable in respect of not allowing the storage stability of the aluminum particles containing metallic amine salt to decrease.

(Content of Organic Phosphorus Compound)

The content of the organic phosphorous compound in the aluminum pigment is preferably in a range from 0.05 to 10 parts by mass, and particularly preferably in a range from 0.1 to 5 parts by mass with respect to 100 parts by mass of the aluminum particles. In a case where the content of the organic phosphorous compound is 0.05 parts by mass or more, the adding effect of the organic phosphorous compound is good, and in a case where it is 10 parts by mass or less, the physical properties of the coating film such as adhesiveness, weather resistance, and moisture resistance are hardly affected harmfully.

The content of the organic phosphorous compound is preferably changed depending on the water-surface diffusion area of the aluminum particles. Specifically, the content is in a range from 0.05 to 10 parts by mass with respect to 100 parts by mass of the aluminum particles, and preferably satisfies the following formula, $$0.1 \times S \leq P \leq 2 \times S$$

wherein, P is the content (parts by mass) of the organic phosphorous compound with respect to 100 parts by mass of the aluminum particles, and S is the water-surface diffusion area ($m^2/g$) of the aluminum particles.

<Other Layers>

In the present invention, a resin film may be coating outside of the metallic amine salt film with the adsorption layer containing the above-described organic phosphorous compound interposed therebetween or in place of the above-described adsorption layer. Examples of the resin film are single polymers or copolymers synthesized from one type or two or more types of monomers including at least any of reactive monomers having a carboxyl group and/or phosphoric group, multi-functional acrylic ester monomers of trifunctional or more, and polymerizable monomers having a benzene nucleus. In a case of forming the resin film, when forming the coating film using the coating composition incorporated with the aluminum particles containing the metallic amine salt of the present invention and the paint resin, there is imparted an effect that the adhesiveness of the aluminum particles containing the metallic amine salt with the paint resin increases, and that the physical properties of the coating film become good. Further, there is also imparted an effect that the formation of the resin-coated layer allows the chemical resistance of the coating film to increase.

Other than that, one layer or two or more layers of a coupling agent, etc. containing for example silicon and/or titanium may be further formed inside and/or outside of the metallic amine salt film so long as the effect of the present invention is not impaired.

[Producing Method for Producing the Aluminum Pigment of the Present Invention]

Further, the present invention also provides a producing method for obtaining the above-described aluminum pigment. The method for producing the aluminum pigment of the present invention can produce the aluminum pigment by a method including the step of preparing the metallic amine salt solution formed by dissolving at least metallic amine salt to a hydrophobic solvent or a hydrophilic solvent, and the step of forming a film containing the metallic amine salt on the surface of the aluminum particle by mixing at least aluminum particles and the metallic amine salt solution.

In the method for producing the aluminum pigment with aluminum paste treatment using peroxypolymolybdic acid, etc. for example, there is a problem that it is difficult to control the step because it passes through an intense chemical reaction. On the other hand, in the producing method of the present invention, because the metallic amine salt film can be formed by mixing the metallic amine salt in a solution form with the aluminum particles, a film excellent in water resistance can be formed without passing through the intense chemical reaction or a complicated operation. That is, according to the producing method of the present invention, an aluminum pigment excellent in the chemical stability can be produced with a simple process.

Further, the producing method of the present invention has an advantage in respect of being able to form a water-resistant film at a uniform and sufficient thickness compared to a case of forming the film by passing through a complicated chemical reaction, for example.

<Step of Preparing Metallic Amine Salt Solution>

In the step of preparing metallic amine salt solution, the metallic amine salt solution is prepared by dissolving at least metallic amine salt in a hydrophobic solvent or a hydrophilic solvent. As the hydrophobic solvent that can be preferably used, such as mineral spirits, petroleum benzine, solvent naphtha, isoparaffin, normal paraffin, benzene, toluene, xylene, cyclohexane, hexane, heptane, octane, chlorobenzene, trichlorobenzene, perchloroethylene, and trichloroethylene are included, and as the hydrophilic solvent that can be preferably used, such as methyl alcohol, ethyl alcohol, isopropyl alcohol, n-propyl alcohol, t-butyl alcohol, n-butyl alcohol, isobutyl alcohol, ethyl cellosolve, butyl cellosolve, propylene glycol monobutylether, dipropylene glycol monomethylether, propylene glycol monopropylether, and acetone are included.

Surfactants, particularly nonionic surfactants, etc. may be further contained in the metallic amine salt solution for the purpose of improving a compatibility with solvents, etc. in the film forming step.

<Step of Forming Film>

In the step of forming a film, the metallic amine salt film is formed on the surface of the aluminum particles by mixing at least aluminum particles and the above-described metallic amine salt solution. The above-described mixing method is not particularly limited, and kneading, stirring and mixing, etc. can be adopted. For example, a method of adding the metallic amine salt solution to the aluminum particles while kneading the aluminum particles using a kneader mixer to be mixed is preferable in respect that it is simple and that the metallic amine salt film can be formed effectively. However, a method of adding or adding dropwise the metallic amine salt solution to a slurry of which the aluminum particles are dispersed into the hydrophobic solvent or the hydrophilic solvent to be stirred and mixed, that is a slurry treatment, can be also performed.

Addition of the metallic amine salt solution to the aluminum particles may be performed by adding the entire amount of the solution at a time, or by adding the solution as divided in several times or by adding the same sequentially and continuously. In a case of adding the entire amount at a time, after adding, the slurry containing the aluminum particles and the metallic amine salt solution is preferably kept for stirring for 30 minutes or more while keeping its temperature constant, and in a case of adding sequentially and continuously, the adding of the metallic amine salt solution is preferably performed over 30 to 120 minutes in order that the metallic amine salt is selectively reacted with the aluminum particles surface. Moreover, when mixing, the reaction is desirably controlled by adjusting conditions such as temperature, pressure, and humidity depending on necessity. However, the adding method of the metallic amine salt is not particularly limited to these methods.

In the step of forming a film, the aluminum particles are preferably supplied in a form of an aluminum particles composition containing the aluminum particles and the organic solvent, and a typical example of the aluminum particle composition is an aluminum paste. The aluminum paste is typically a pasty composition incorporated with 10 to 100 parts by mass of the organic solvent such as mineral spirits with respect to 100 parts by mass of a flake-like aluminum, and fatty acid such as oleic acid and stearic acid is adsorbed on the surface of the aluminum particles.

The above-described fatty acid, etc. may be attached on the surface of the aluminum particles when producing the aluminum pigment of the present invention. However, the fatty acid on the surface of the aluminum particles is desirably removed as much as possible in advance by a cleaning operation, etc. using an organic solvent such as mineral spirits in respect that the metallic amine salt film can be formed more certainly on the surface of the aluminum particles.

An aluminum paste having a non-volatile portion of 50 to 80% by mass (aluminum particles), an average particle size of 3 to 100 μm, and a thickness of about 0.02 to 5 μm can be preferably used.

<Step of Forming Adsorption Layer>

The method for producing the aluminum pigment of the present invention may further include the step of forming an adsorption layer containing the organic phosphorous compound on the metallic amine salt film after the step of forming a film. By forming the adsorption layer, dispersibility of the aluminum pigment in the paint, as well as color appearance, alkaline resistance, and adhesiveness of the coating film can be improved. Examples of the preferred organic phosphorous compound are the organic phosphorus compounds described before.

<Other Steps>

In the present invention, the step of forming a resin film may be further provided in a case of forming a resin film through the above-described adsorption layer interposed therebetween or instead of the above-described adsorption layer. For example, the resin film can be formed by such as a method of solid-liquid separating the aluminum particles containing the metallic amine salt, cleaning and filtering with a nonpolar solvent depending on necessity, dispersing into a nonpolar solvent, adding a polymerizable monomer and a polymerization initiator, polymerizing the monomer by heating while stirring, and precipitating a resin layer on the surface of the aluminum particles containing the metallic amine salt.

Further, a surfactant, a corrosion inhibitor, etc may be attached on the surface of the aluminum pigment of the present invention for the purpose of improving dispersibility of the aluminum pigment in the paint and affinity with the paint resin or for the purpose of further improving corrosion resistance. Examples of the surfactant include such as polyoxyethylene alkylphenolether, polyoxyethylene alkylamine, and alkylbenzene sulfonate, and an example of the corrosion inhibitor includes such as dimer acid.

The aluminum pigment can be recovered, for example, as a pasty substance after being produced through each step as described above.

[Paint and Ink]

The present invention further provides as well a water-based metallic paint composition produced by incorporating the aluminum pigment as described above. The aluminum pigment of the present invention can be used as a resin composition incorporated into a paint, an ink, etc. Examples of the resin composition referred herein include such as a paint, a coating film obtained from the paint, an ink, and prints using the ink. The paint and the ink are usable in any of an organic solvent type and a water-based composition. However, the aluminum pigment of the present invention does not react with a component of resins etc. contained in the water-based paint or the water-based ink because the metallic amine salt film is formed. Therefore, the generation of hydrogen gas and the aggregation of the aluminum pigment are prevented during storage. The aluminum pigment of the present invention is preferably incorporated into the water-based metallic paint composition or the water-based metallic ink composition in respect that good storage stability can be imparted by obtaining the improving effect of the chemical stability and the aggregation preventing effect more remarkably.

Further, the coating film and the prints obtained respectively from the paint and the ink into which the aluminum pigment of the present invention is incorporated have excellent moisture resistance due to the above-described chemical stability.

For the amount of the aluminum pigment incorporated in a case of using in the resin composition, the content of the aluminum pigment in the resin composition is preferably in a range from 0.1 to 30% by mass. In a case where the content of the aluminum pigment is 0.1% by mass or more, a decoration (particularly, metallic) effect is good, and in a case of 30% by mass or less, the physical properties (particularly, weather resistance, corrosion resistance, mechanical strength, etc.) of the resin composition can be kept good. The content of the aluminum pigment in the resin composition is more preferably in a range from 1 to 20% by mass.

The paint and the ink can be typically constituted with the following components.
1) Resin: One or more types of resins selected from for example an acrylic resin, an alkyd resin, a polyester resin, a polyurethane resin, a polyvinylacetate resin, a nitrocellulose resin, and a fluorine resin, etc. can be preferably used.
2) Pigment: A coloring pigment, an extender pigment, or a dye may be used in combination besides the aluminum pigment of the present invention. For example, phthalocyanine, quinacridone, isoindolinone, perylene, azolake, iron oxide, chrome yellow, carbon black, titanium oxide, pearl mica, etc. can be preferably used.
3) Additive: Water, an organic solvent, a surfactant, a curing agent, an ultraviolet ray absorber, an electrostatic remover, a thickener, etc. can be exemplified.

The coating film formed using the resin composition as a paint incorporated with the aluminum pigment of the present invention may be formed on an undercoat layer and an intermediate coat layer by such as electrodeposition coating. Further, a top coat layer may be further formed on the coating film.

EXAMPLES

Below, the present invention will be described in detail by way of examples. However, the present invention is not limited to these.

Example 1

A metallic amine salt film was formed on the surface of aluminum particles by adding a solution in which 20 g of a solution of an alkylamine salt of molybdic acid (trade name: SAKURA-LUBE S-710 (diisotridecylamine molybdate: 26 carbon atoms) manufactured by ADEKA Corporation) was dissolved in 100 g of mineral spirits to 1 kg of a paste of aluminum flake particles sold on the market (7640NS manufactured by Toyo Aluminium K.K., non-volatile content 65% by mass, average particle size 17 μm, water-surface diffusion area 1.5 m²/g, below abbreviated as 7640NS cake), and kneading the mixture at room temperature (25° C.) for 10 minutes. A pasty aluminum pigment was obtained with the above method.

This pasty aluminum pigment was washed with acetone, dried, and the content of Mo (molybdenum) and the content of N (nitrogen) in the powdered sample were quantitatively analyzed with plasma emission analysis and a total nitrogen analyzer respectively. As a result, Mo was 0.29 parts by mass, and N was 0.0423 parts by mass (423 ppm) with respect to 100 parts by mass of aluminum.

Example 2

A metallic amine salt film was formed on the surface of aluminum particles by adding a solution in which 10 g of a solution of an alkylamine salt of molybdic acid (trade name: SAKURA-LUBE S-710 manufactured by ADEKA Corporation) was dissolved in 100 g of mineral spirits to 1 kg of the 7640NS cake used in Example 1, and kneading the mixture at room temperature (25° C.) for 10 minutes. By adding a solution in which 10 g of octyl acid phosphate (trade name: JP508 manufactured by Johoku Chemical Co., Ltd.) is dissolved in 20 g of dipropylene glycol monomethylether to the above intermediate product and further mixing at room temperature for 10 minutes, an adsorption layer containing an organic phosphorous compound was formed. A pasty aluminum pigment was obtained with the above method.

This pasty aluminum pigment was washed with acetone, dried, and the content of Mo (molybdenum) and the content of P (phosphorus) in the powdered sample were quantitatively analyzed with plasma emission analysis, and the content of N (nitrogen) in the sample was quantitatively analyzed with a total nitrogen analyzer, respectively. As a result, Mo was 0.12 parts by mass, P was 0.08 parts by mass, and N was 0.0175 parts by mass (175 ppm) with respect to 100 parts by mass of aluminum.

Example 3

A metallic amine salt film was formed on the surface of aluminum particles by adding a solution in which 10 g of a solution of an alkylamine salt of molybdic acid (trade name: SAKURA-LUBE S-710 manufactured by ADEKA Corporation) was dissolved in 100 g of isopropyl alcohol to 1 kg of the 7640NS cake used in Example 1, and kneading it at room temperature (25° C.) for 10 minutes. By adding a solution in which 10 g of 2081PO (2081PO is a compound described on pages 13 and 14 in Patent Document 6 (International Publication No. WO 2002/031061), and is as an adduct of an alicyclic epoxy compound (trade name: Celoxide 2081 manufactured by Daicel Chemical Industries., Ltd.) and a phosphoric acid compound) is dissolved in 20 g of isopropyl alcohol to the above intermediate product and further mixing at room temperature for 10 minutes, an adsorption layer containing an organic phosphorous compound was formed. A pasty aluminum pigment was obtained with the above method.

This pasty aluminum pigment was washed with acetone, dried, and the content of Mo (molybdenum) and the content of P (phosphorus) in the powdered sample were quantitatively analyzed with plasma emission analysis, and the content of N (nitrogen) in the sample was quantitatively analyzed with a total nitrogen analyzer, respectively. As a result, Mo was 0.14 parts by mass, P was 0.04 parts by mass, and N was 0.0204 parts by mass (204 ppm) with respect to 100 parts by mass of aluminum.

Example 4

A metallic amine salt film was formed on the surface of aluminum particles by adding a solution in which 10 g of a solution of an alkylamine salt of molybdic acid (trade name: SAKURA-LUBE S-710 manufactured by ADEKA Corporation) was dissolved in 100 g of mineral spirits to 1 kg of the 7640NS cake used in Example 1, and kneading the mixture at room temperature (25° C.) for 10 minutes. By adding a solution in which 10 g of an adduct of neopentyl glycol diglycidyldiether and a phosphorous compound (trade name: NPG-PO manufactured by Daicel Chemical Industries., Ltd.) is dissolved in 20 g of isopropyl alcohol to the above intermediate product and further mixing at room temperature for 10 minutes, an adsorption layer containing an organic phosphorous compound was formed. A pasty aluminum pigment was obtained with the above method.

This pasty aluminum pigment was washed with acetone, dried, and the content of Mo (molybdenum) and the content of P (phosphorus) in the powdered sample were quantitatively analyzed with plasma emission analysis, and the content of N (nitrogen) in the sample was quantitatively analyzed with a total nitrogen analyzer, respectively. As a result, Mo was 0.15 parts by mass, P was 0.03 parts by mass, and N was 0.0218 parts by mass (218 ppm) with respect to 100 parts by mass of aluminum.

Example 5

While stirring a slurry in which 500 g of the 7640NS cake used in Example 1 was dispersed into 2000 ml of mineral spirits, a solution in which 10 g of a solution of an alkylamine salt of molybdic acid (trade name: SAKURA-LUBE S-710 manufactured by ADEKA Corporation) was dissolved in 100 g of mineral spirits was gradually added to the slurry. Allowing to react for 1 hour at the slurry temperature kept at 50° C., a metallic amine salt film was formed on the surface of aluminum particles. After that, the slurry was subjected to solid-liquid separation, and a pasty aluminum pigment having a solid content of 60% by mass was obtained.

This pasty aluminum pigment was washed with acetone, dried, and the content of Mo (molybdenum) and the content of N (nitrogen) in the powdered sample were quantitatively analyzed with plasma emission analysis and a total nitrogen analyzer respectively. As a result, Mo was 0.22 parts by mass, and N was 0.0321 parts by mass (321 ppm) with respect to 100 parts by mass of aluminum.

Example 6

A metallic amine salt film was formed on the surface of aluminum particles by adding a solution in which 20 g of a solution of an alkylamine salt of molybdic acid (trade name: SAKURA-LUBE S-710 manufactured by ADEKA Corporation) was dissolved in 100 g of mineral spirits to 1 kg of a paste of aluminum flake particles sold on the market (5640NS manufactured by Toyo Aluminium K.K., non-volatile content 70% by mass, average particle size 13 μm, water-surface diffusion area 1.6 m²/g), and kneading the mixture at room temperature (25° C.) for 10 minutes. A pasty aluminum pigment was obtained with the above method.

This pasty aluminum pigment was washed with acetone, dried, and the content of Mo (molybdenum) and the content of N (nitrogen) in the powdered sample were quantitatively analyzed with plasma emission analysis and a total nitrogen analyzer respectively. As a result, Mo was 0.27 parts by mass, and N was 0.0394 parts by mass (394 ppm) with respect to 100 parts by mass of aluminum.

Comparative Example 1

An inorganic film was formed on the surface of aluminum particles by adding 20 g of 2-dimethylaminoethanol and a solution in which a solution obtained by adding 8 g of metallic molybdenum powder to 100 g of hydrogen peroxide solution containing 30% by mass of hydrogen peroxide little by little to be reacted was dissolved in 175 g of isopropyl alcohol to 1 kg of the 7640NS cake used in Example 1, and kneading the mixture at 60° C. for 1 hour. An adsorption layer containing an organic phosphorous compound was formed by adding 100 g of dipropylene glycol monomethylether and 10 g of octyl acid phosphate to this, and mixing further at normal temperature for 30 minutes. A pasty aluminum pigment was obtained with the above method.

This pasty aluminum pigment was washed with acetone, dried, and the content of Mo (molybdenum) and the content of P (phosphorus) in the powdered sample were quantitatively analyzed with plasma emission analysis, and the content of N (nitrogen) in the sample was quantitatively analyzed with a total nitrogen analyzer, respectively. As a result, Mo was 0.95 parts by mass, P was 0.07 parts by mass, and N was 0.0263 parts by mass (263 ppm) with respect to 100 parts by mass of aluminum.

Comparative Example 2

An inorganic film was formed on the surface of aluminum particles by adding 20 g of morpholine and a solution in which a solution obtained by adding 8 g of metallic molybdenum powder to 100 g of hydrogen peroxide solution containing 30% by mass of hydrogen peroxide little by little to be reacted was dissolved in 175 g of isopropyl alcohol to 1 kg of the 7640NS cake used in Example 1, and kneading the mixture at 60° C. for 1 hour. An adsorption layer containing an organic phosphorous compound was formed thereon, and at the same time, a surfactant was attached thereto by adding 100 g of dipropylene glycol monomethylether, 10 g of oleyl acid phosphate, and 20 g of polyoxyethylene nonylphenolether as the surfactant to this, and mixing further at normal temperature for 30 minutes. A pasty aluminum pigment was obtained with the above method.

This pasty aluminum pigment was washed with acetone, dried, and the content of Mo (molybdenum) and the content of P (phosphorus) in the powdered sample were quantitatively analyzed with plasma emission analysis, and the content of N (nitrogen) in the sample was quantitatively analyzed with a total nitrogen analyzer, respectively. As a result, Mo was 0.96 parts by mass, P was 0.03 parts by mass, and N was 0.0266 parts by mass (266 ppm) with respect to 100 parts by mass of aluminum.

Comparative Example 3

A passive film was formed on the surface of aluminum particles by adding 20 g of 3-(2-ethylhexyloxy)propylamine and a solution in which a solution obtained by adding 8 g of metallic molybdenum powder to 100 g of hydrogen peroxide solution containing 30% by mass of hydrogen peroxide little by little to be reacted was dissolved in 175 g of isopropyl alcohol to 1 kg of the 7640NS cake used in Example 1, and kneading the mixture at 60° C. for 1 hour. An adsorption layer containing an organic phosphorous compound was formed by adding 100 g of dipropylene glycol monomethylether and 15 g of the above-described 2081PO to this, and mixing further at normal temperature for 30 minutes. A pasty aluminum pigment was obtained with the above method.

This pasty aluminum pigment was washed with acetone, dried, and the content of Mo (molybdenum) and the content of P (phosphorus) in the powdered sample were quantitatively analyzed with plasma emission analysis, and the content of N (nitrogen) in the sample was quantitatively analyzed with a total nitrogen analyzer, respectively. As a result, Mo was 0.98 parts by mass, P was 0.04 parts by mass, and N was 0.0271 parts by mass (271 ppm) with respect to 100 parts by mass of aluminum.

Comparative Example 4

An adsorption layer containing an organic phosphorous compound was formed on the surface of aluminum particles by adding a solution in which 10 g of oleyl acid phosphate was dissolved in 220 g of mineral spirits to 1 kg of the 7640NS cake used in Example 1, and kneading the mixture for 30 minutes. A pasty aluminum pigment having a solid content of 65% by mass was obtained.

This pasty aluminum pigment was washed with acetone, dried, and the content of Mo (molybdenum) and the content of P (phosphorus) in the powdered sample were quantitatively analyzed with plasma emission analysis. As a result, Mo was not detected, and P was 0.04 parts by mass with respect to 100 parts by mass of aluminum.

Comparative Example 5

While stirring a slurry in which 500 g of the 7640NS cake used in Example 1 was dispersed into 2000 ml of isopropyl alcohol, a solution in which a solution obtained by adding 8 g of metallic molybdenum powder to 100 g of hydrogen peroxide solution containing 30% by mass of hydrogen peroxide little by little to be reacted was dissolved in 175 g of isopropyl alcohol was gradually added to the slurry. Allowing to react for 1 hour at the slurry temperature kept at 50° C., an inorganic film was formed on the surface of aluminum particles. After that, the slurry was subjected to solid-liquid separation, and a pasty aluminum pigment having a solid content of 60% by mass was obtained.

This pasty aluminum pigment was washed with acetone, dried, and the content of Mo (molybdenum) in the powdered sample was quantitatively analyzed with plasma emission analysis. As a result, Mo was 0.3 parts by mass with respect to 100 parts by mass of aluminum.

Comparative Example 6

An inorganic film was formed on the surface of aluminum particles by adding 20 g of 2-dimethylaminoethenol and a solution in which a solution obtained by adding 8 g of metallic molybdenum powder to 100 g of hydrogen peroxide solution containing 30% by mass of hydrogen peroxide little by little to be reacted was dissolved into 175 g of isopropyl alcohol to 1 kg of the 5640NS cake used in Example 6, and kneading the mixture at 60° C. for 1 hour.

Then, an adsorption layer containing an organic phosphorous compound was formed by further adding 100 g of dipropylene glycol monomethylether and 10 g of octyl acid phosphate to this, and mixing further at normal temperature for 30 minutes. A pasty aluminum pigment was obtained with the above method.

This pasty aluminum pigment was washed with acetone, dried, and the content of Mo (molybdenum) and the content of P (phosphorus) in the powdered sample were quantitatively analyzed with plasma emission analysis, and the content of N (nitrogen) in the sample was quantitatively analyzed with a total nitrogen analyzer, respectively. As a result, Mo was 0.90 parts by mass, P was 0.06 parts by mass, and N was 0.0249 parts by mass (249 ppm) with respect to 100 parts by mass of aluminum.

The above-described analytical results of the aluminum pigment produced in Examples 1 to 6 and Comparative Examples 1 to 6 are summarized in Table 1.

TABLE 1

| | Adsorption Layer Containing Organic Phosphorous Compound | Content (Parts by Mass) With Respect to 100 Parts by Mass of Aluminum | | |
|---|---|---|---|---|
| | | Content of Mo | Content of P | Content of N |
| Example 1 | absence | 0.29 | — | 0.0423 |
| Example 2 | presence | 0.12 | 0.08 | 0.0175 |
| Example 3 | presence | 0.14 | 0.04 | 0.0204 |
| Example 4 | presence | 0.15 | 0.03 | 0.0218 |
| Example 5 | absence | 0.22 | — | 0.0321 |
| Example 6 | absence | 0.27 | — | 0.0394 |
| Comparative Example 1 | presence | 0.95 | 0.07 | 0.0263 |
| Comparative Example 2 | presence | 0.96 | 0.03 | 0.0266 |
| Comparative Example 3 | presence | 0.98 | 0.04 | 0.0271 |
| Comparative Example 4 | presence | not detected | 0.04 | — |
| Comparative Example 5 | absence | 0.3 | — | — |
| Comparative Example 6 | presence | 0.90 | 0.06 | 0.0249 |

Examples 7 to 12

A water-based metallic paint was produced with the following composition using each of the pasty aluminum pigments obtained in Examples 1 to 6.

| | |
|---|---|
| Aluminum pigment (as a solid content) | 3.0 g |
| Water-soluble acrylic resin (ALMATEX WA911 manufactured by Mitsui Chemicals, Inc.) | 28.2 g |
| Melamine resin (CYMEL 350 manufactured by Mitsui Cytec Co., Ltd.) | 4.4 g |
| Triethanolamine | 1.1 g |
| Deionized water (viscosity was adjusted to 1000 to 3000 cP) | appropriate amount |
| Isopropylalcohol | 3.0 g |
| Transparent iron oxide (SICOTRANS RED L2175D manufactured by BASF) | 5.0 g |

Comparative Examples 7 to 12

A water-based metallic paint was produced with the same composition and method as in Examples 7 to 12 except for using each of the aluminum pigments obtained in Comparative Examples 1 to 6 instead of the aluminum pigments obtained in Examples 1 to 6.

—Test 1—

Screen residue was measured by dispersing 10 g of each of the aluminum pigments used in Examples 7 to 12 and Comparative Examples 7 to 12 into isopropyl alcohol and using a wet screen method with a screen having an opening of 45 μm.

Furthermore, the screen residue was also measured in 10 g of a sample in which each of the above-described aluminum pigments was kept at 50° C. for 7 days by the same method.

—Test 2—

The amount of accumulated hydrogen gas generated was measured in a case of collecting 80 g of each of the water-based metallic paint produced in Examples 7 to 12 and Comparative Examples 7 to 12 and storing in a double boiler adjusted to 50° C. for 7 days.

The results of Test 1 and Test 2 are shown in Table 2.

TABLE 2

| | Aluminum Pigment Used | Test 1, Screen Residue (% by Mass) | | Test 2, Amount of Gas |
|---|---|---|---|---|
| | | Right After | 50° C. for 7 Days | Generated (ml) |
| Example 7 | Example 1 | 0.00 | 0.00 | 0.8 |
| Example 8 | Example 2 | 0.00 | 0.00 | 0.3 |
| Example 9 | Example 3 | 0.02 | 0.02 | 0.5 |
| Example 10 | Example 4 | 0.02 | 0.02 | 0.7 |
| Example 11 | Example 5 | 0.00 | 0.00 | 3.6 |
| Example 12 | Example 6 | 0.00 | 0.00 | 1.2 |
| Comparative Example 7 | Comparative Example 1 | 0.05 | 0.05 | 0.5 |
| Comparative Example 8 | Comparative Example 2 | 0.05 | 0.07 | 0.3 |
| Comparative Example 9 | Comparative Example 3 | 0.05 | 0.05 | 0.3 |
| Comparative Example 10 | Comparative Example 4 | 0.00 | 0.00 | 7.3 |
| Comparative Example 11 | Comparative Example 5 | 0.00 | 0.00 | 2.1 |
| Comparative Example 12 | Comparative Example 6 | 0.05 | 0.05 | 0.8 |

As shown in Table 2, in the water-based metallic paints in Comparative Examples 7 and 9 using the aluminum pigment of Comparative Examples 1 and 2 in which an inorganic film and an adsorption layer were formed and of Comparative Example 3 in which a passive film and an adsorption layer were formed, the amount of hydrogen gas generated was small. However, a tendency of a large amount of screen residues in both of right after and 50° C. for 7 days was recognized, and it was found that the aluminum pigment was aggregated. Further, in the water-based metallic paints in Comparative Examples 10 and 11 using the aluminum pigments of Comparative Example 4 in which only an adsorption layer was formed and of Comparative Example 5 in which only an inorganic film was formed, the amounts of the screen residue right after and 50° C. for 7 days were small and the aggregation of the aluminum pigment was not generated. However, a tendency of a large amount of hydrogen gas generated was recognized, and it was found that water resistance was low.

In Comparative Examples 6 in which an inorganic film and an adsorption layer were formed, there was a tendency that the amount of hydrogen gas generated was small. However, there was a tendency that the amount of the screen residue was large in both of right after and 50° C. for 7 days.

On the other hand, in the water-based metallic paints in Examples 7 to 12 using the aluminum pigments in Examples 1 to 6 in which the metallic amine salt film was formed, there was a tendency that the amounts of the screen residue right after and 50° C. for 7 days were small, and the amount of gas generated was small.

Further, in the water-based metallic paints in Examples 8 to 10 using the aluminum pigment in which an adsorption layer containing an organic phosphorous compound was formed, in addition to the metallic amine salt film, the amount of gas generated was particularly remarkably small, and the improving effect of the chemical stability was confirmed.

From the above results, it is found that an aluminum pigment having good chemical stability and being difficult to aggregate can be obtained according to the present invention.

It should be understood that the embodiments disclosed herein are illustrative and non-restrictive in every respect. The scope of the invention is defined by the claims, rather than the description above, and is intended to include all modifications equivalent in meaning and scope to the claims.

INDUSTRIAL APPLICABILITY

The aluminum pigment of the present invention can be preferably applied to a paint, an ink, etc., particularly a water-based metallic paint, a water-based metallic ink, etc.

The invention claimed is:

1. An aluminum pigment comprising an aluminum particle having a film formed on a surface thereof, wherein
said film contains a metallic amine salt, and
said metallic amine salt is represented by the compositional formula $R_m H_n N^{+-}O-M(=O)_2-OH$ (wherein M represents a metal element, R represents a hydrocarbon chain optionally having a substituent, m represents an integer of 1 or more, and n represents an integer satisfying n=4−m).

2. The aluminum pigment according to claim 1, wherein metal element M constituting said metallic amine salt includes at least one selected from elements belonging to at least any of group IVA, group IVB, group VA, group VB, group VIA, and group VIB.

3. The aluminum pigment according to claim 2, wherein said metal element M is molybdenum.

4. The aluminum pigment according to claim 1, wherein an amine constituting said metallic amine salt includes at least one selected from alkylamine, allylamine, arylamine, alkanolamine, and alkoxylamine.

5. The aluminum pigment according to claim 1, wherein the content of the metal element M constituting said metallic amine salt is in a range from 0.02 to 10 parts by mass with respect to 100 parts by mass of said aluminum particles.

6. The aluminum pigment according to claim 1, wherein the content of the amine constituting said metallic amine salt is in a range from 0.01 to 100 parts by mass with respect to 100 parts by mass of said aluminum particles.

7. The aluminum pigment according to claim 1 containing a nitrogen element in a range from 0.0045 to 45 parts by mass with respect to 100 parts by mass of said aluminum particles.

8. The aluminum pigment according to claim 1, wherein the content of said metallic amine salt is in a range from 0.5 to 20 parts by mass with respect to 100 parts by mass of said aluminum particles.

9. The aluminum pigment according to claim 1, further comprising an adsorption layer containing an organic phosphorous compound on said film containing said metallic amine salt.

10. A method for producing the aluminum pigment according to claim 1, comprising the steps of:
preparing a metallic amine salt solution produced by dissolving at least a metallic amine salt into a hydrophobic solvent or a hydrophilic solvent, and forming a film containing the metallic amine salt on the surface of the aluminum particles by mixing at least the aluminum particles and said metallic amine salt solution.

11. The method for producing the aluminum pigment according to claim 10, further comprising the step of forming an adsorption layer containing an organic phosphorous compound on said film after said step of forming a film.

12. A water-based metallic paint composition comprising the aluminum pigment according to claim 1.

* * * * *